(12) United States Patent
Bai et al.

(10) Patent No.: US 12,342,322 B2
(45) Date of Patent: Jun. 24, 2025

(54) IDENTIFYING A DEFAULT BEAM FOR COMMUNICATIONS ON A PHYSICAL DOWNLINK SHARED CHANNEL (PDSCH)

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/215,661

(22) Filed: Mar. 29, 2021

(65) Prior Publication Data
US 2022/0312382 A1 Sep. 29, 2022

(51) Int. Cl.
*H04W 72/02* (2009.01)
*H04W 72/044* (2023.01)
*H04W 72/1273* (2023.01)
*H04W 72/23* (2023.01)
*H04W 72/51* (2023.01)

(52) U.S. Cl.
CPC ......... *H04W 72/02* (2013.01); *H04W 72/044* (2013.01); *H04W 72/1273* (2013.01); *H04W 72/23* (2023.01); *H04W 72/51* (2023.01)

(58) Field of Classification Search
None
See application file for complete search history.

(56) References Cited

U.S. PATENT DOCUMENTS

| | | | |
|---|---|---|---|
| 2019/0159188 A1* | 5/2019 | Sadiq | H04B 7/088 |
| 2019/0254045 A1* | 8/2019 | Sadiq | H04B 7/0617 |
| 2019/0319823 A1* | 10/2019 | Akkarakaran | H04W 80/02 |
| 2020/0077283 A1* | 3/2020 | Zhou | H04B 7/088 |
| 2020/0195334 A1* | 6/2020 | Zhou | H04L 5/005 |
| 2020/0196277 A1* | 6/2020 | Zhou | H04W 72/21 |
| 2020/0196351 A1* | 6/2020 | Zhou | H04W 72/23 |
| 2020/0314663 A1* | 10/2020 | Wang | H04W 16/28 |
| 2020/0350958 A1* | 11/2020 | Zhou | H04B 7/0408 |
| 2021/0259001 A1* | 8/2021 | Park | H04W 72/1289 |
| 2021/0409094 A1* | 12/2021 | Yuan | H04W 72/23 |
| 2022/0225362 A1* | 7/2022 | Yi | H04W 72/1289 |

(Continued)

FOREIGN PATENT DOCUMENTS

| | | | | |
|---|---|---|---|---|
| WO | WO-2020226975 A1 * | 11/2020 | | H04B 7/0408 |
| WO | WO-2021127582 A2 * | 6/2021 | | H04W 36/305 |

(Continued)

*Primary Examiner* — Kodzovi Acolatse
(74) *Attorney, Agent, or Firm* — Patterson + Sheridan, L.L.P.

(57) ABSTRACT

Aspects of the present disclosure provide apparatus, methods, processing systems, and computer readable mediums for selecting a default beam for communications between a user equipment (UE) and network entity on a physical downlink shared channel (PDSCH). An example method generally includes receiving, from a network entity, configuration information, selecting a default beam based on the configuration information, wherein the default beam is selected for use across a plurality of time periods, and receiving a physical downlink shared channel (PDSCH) using the default beam across the plurality of time periods.

24 Claims, 7 Drawing Sheets

(56) References Cited

U.S. PATENT DOCUMENTS

| | | | |
|---|---|---|---|
| 2022/0225369 A1* | 7/2022 | Park | H04W 72/042 |
| 2022/0304037 A1* | 9/2022 | Zhang | H04L 1/08 |
| 2023/0144103 A1* | 5/2023 | Gao | H04W 72/20 |
| | | | 370/329 |

FOREIGN PATENT DOCUMENTS

| | | | | |
|---|---|---|---|---|
| WO | WO-2022154493 A1 * | 7/2022 | | H04B 7/022 |
| WO | WO-2023274369 A1 * | 1/2023 | | |

* cited by examiner

IDENTIFYING A DEFAULT BEAM FOR COMMUNICATIONS ON A PHYSICAL DOWNLINK SHARED CHANNEL (PDSCH)

TECHNICAL FIELD

Aspects of the present disclosure relate to wireless communications, and more particularly, to techniques for identifying and using a default beam for transmitting and receiving communications on a physical downlink shared channel (PDSCH).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements, e.g., improvements in latency, reliability, and the like, in NR and LTE technology remain useful. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communications by a user equipment (UE). The method generally includes receiving, from a network entity, configuration information, selecting a default beam based on the configuration information, wherein the default beam is selected for use across a plurality of time periods, and receiving a physical downlink shared channel (PDSCH) using the default beam across the plurality of time periods.

One innovative aspect of the subject matter described in this disclosure can be implemented in a method for wireless communications by a network entity. The method generally includes transmitting, to a user equipment (UE), configuration information that the UE can use to identify a default beam for receiving a physical downlink shared channel (PDSCH), selecting a default beam based on the configuration information, wherein the default beam is selected for use across a plurality of time periods, and transmitting the PDSCH using the default beam across the plurality of time periods.

One innovative aspect of the subject matter described in this disclosure can be implemented in a user equipment (UE). The UE generally includes means for receiving, from a network entity, configuration information, means for selecting a default beam based on the configuration information, wherein the default beam is selected for use across a plurality of time periods, and means for receiving a physical downlink shared channel (PDSCH) using the default beam across the plurality of time periods.

One innovative aspect of the subject matter described in this disclosure can be implemented in a network entity. The network entity generally includes means for transmitting, to a user equipment (UE), configuration information that the UE can use to identify a default beam for receiving a physical downlink shared channel (PDSCH), means for selecting a default beam based on the configuration information, wherein the default beam is selected for use across a plurality of time periods, and means for transmitting the PDSCH using the default beam across the plurality of time periods.

One innovative aspect of the subject matter described in this disclosure can be implemented in a user equipment (UE). The UE generally includes a receiver, a memory having instructions stored thereon, and at least one processor configured to execute the executable instructions to cause: the receiver to receive, from a network entity, configuration information the at least one processor to select a default beam based on the configuration information, wherein the default beam is selected for use across a plurality of time periods, and the receiver to receive a physical downlink shared channel (PDSCH) using the default beam across the plurality of time periods.

One innovative aspect of the subject matter described in this disclosure can be implemented in a network entity. The network entity generally includes a transmitter, a memory having executable instructions stored thereon, and at least one processor configured to execute the executable instructions to cause: the transmitter to transmit, to a user equipment (UE), configuration information, the at least one processor to select a default beam based on the configuration information, wherein the default beam is selected for use across a plurality of time periods, and the transmitter to transmit a physical downlink shared channel (PDSCH) using the default beam across the plurality of time periods.

One innovative aspect of the subject matter described in this disclosure can be implemented in an apparatus for wireless communications by a user equipment (UE). The apparatus generally includes an interface configured to obtain, from a network entity, configuration information, a memory having instructions stored thereon, and at least one processor configured to execute the instructions to cause the apparatus to: select a default beam based on the configuration information, wherein the default beam is selected for use across a plurality of time periods and obtain a physical downlink shared channel (PDSCH) using the default beam across the plurality of time periods.

One innovative aspect of the subject matter described in this disclosure can be implemented in an apparatus for wireless communications by a network entity. The apparatus generally includes an interface configured to output, for transmission to a user equipment (UE), configuration information, a memory having instructions stored thereon, and at least one processor configured to execute the instructions to cause the apparatus to: select a default beam based on the configuration information, wherein the default beam is selected for use across a plurality of time periods; and initiate a transmission of a physical downlink shared channel (PDSCH) via the default beam across the plurality of time periods.

One innovative aspect of the subject matter described in this disclosure can be implemented in a computer-readable medium for wireless communications by an apparatus. The computer-readable medium generally includes instructions executable by the apparatus to obtain, from a network entity, configuration information, select a default beam based on the configuration information, wherein the default beam is selected for use across a plurality of time periods, and obtain a physical downlink shared channel (PDSCH) using the default beam across the plurality of time periods.

One innovative aspect of the subject matter described in this disclosure can be implemented in a computer-readable medium for wireless communications by an apparatus. The computer-readable medium generally includes instructions executable by the apparatus to output, for transmission to a user equipment (UE), configuration information, select a default beam based on the configuration information, wherein the default beam is selected for use across a plurality of time periods, and initiate a transmission of a physical downlink shared channel (PDSCH) via the default beam across the plurality of time periods.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of buta few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for identifying and using a default beam to transmit and receive a physical downlink shared channel (PDSCH).

The following description provides examples of identifying and using a default beam to transmit and receive a physical downlink shared channel (PDSCH), and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
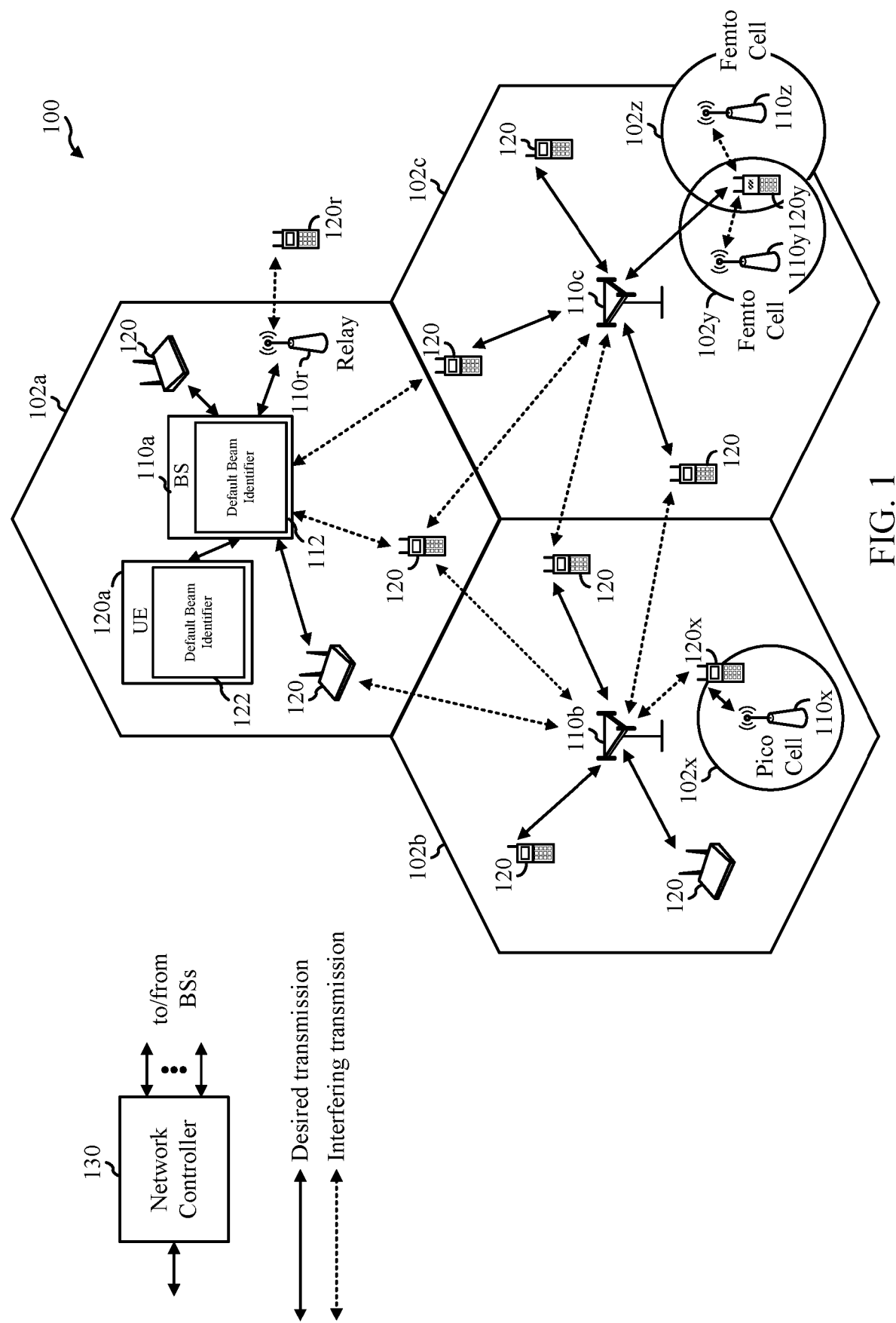
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a rate matching module 122 that may be configured to perform (or cause UE 120a to perform) operations 400 of FIG. 4. Similarly, a base station 110a may include a rate matching configuration module 112 that may be configured to transmit a DCI to UE 120a to schedule a PDSCH and cause the UE to perform operations 500 of FIG. 5.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
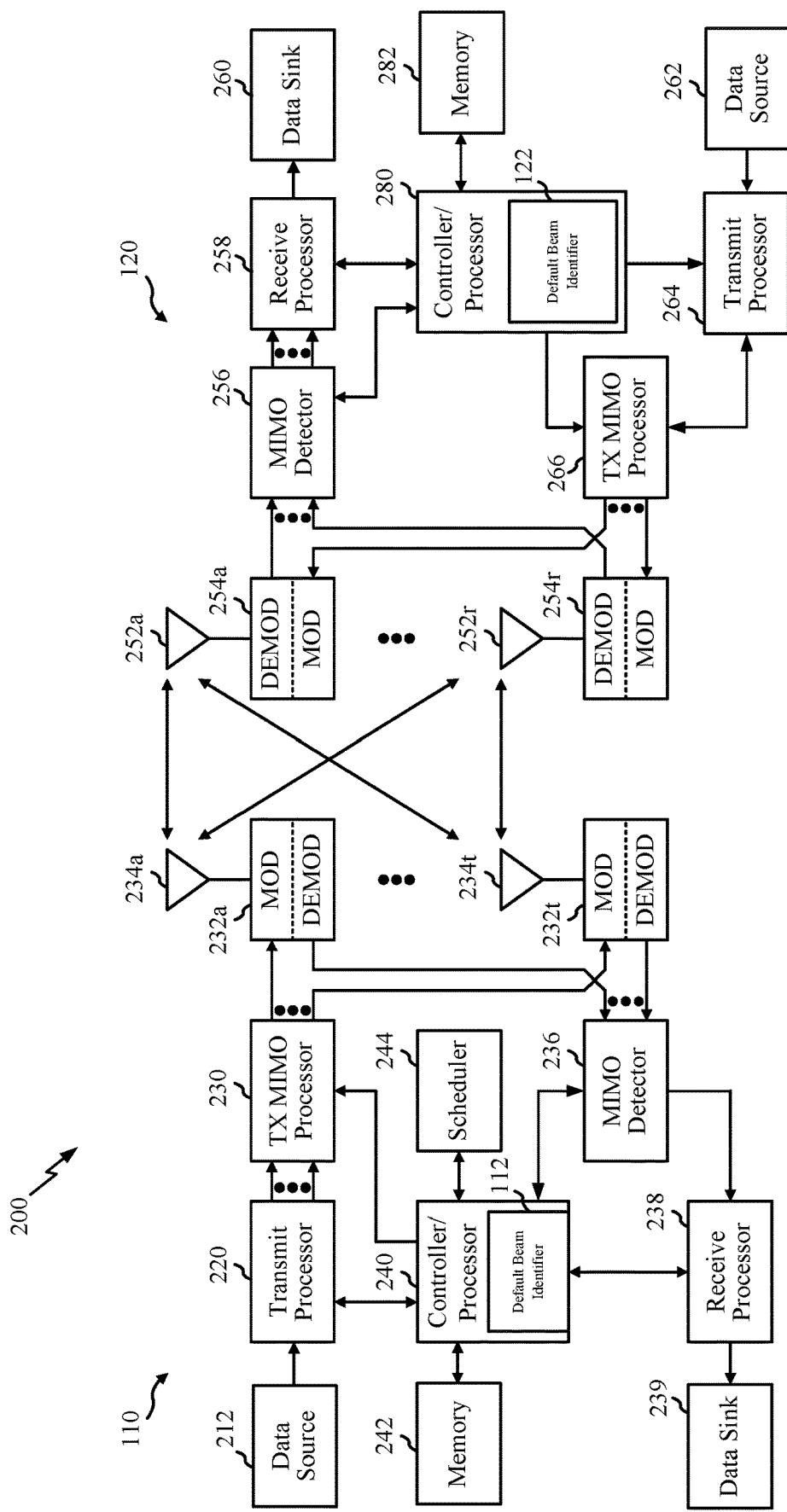
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink. In one example, memory 282 or memory 242 can be a non-transitory computer-readable medium comprising instructions (e.g., instructions that instruct a processor, e.g., controller/processor 680, controller/processor 640, or other processor) to perform any aspects of FIG. 4 or FIG. 5. Additionally or alternatively, such instructions may be copied or installed onto memory 282 or memory 242 from a non-transitory computer-readable medium.

The controller/processor 280 or other processors and modules at the UE 120 may perform or direct the execution of processes for the techniques described herein. As shown in FIG. 2, the controller/processor 280 of the UE 120 has default beam identifier 122 that may be configured to perform operations 400 of FIG. 4, as discussed in further detail below. The controller/processor 240 of the base station 110 includes a default beam identifier 112 that may be configured perform operations 500 of FIG. 5, as discussed in further detail below. Although shown at the Controller/Processor, other components of the UE or BS may be used to perform the operations described herein.

Figure 3:
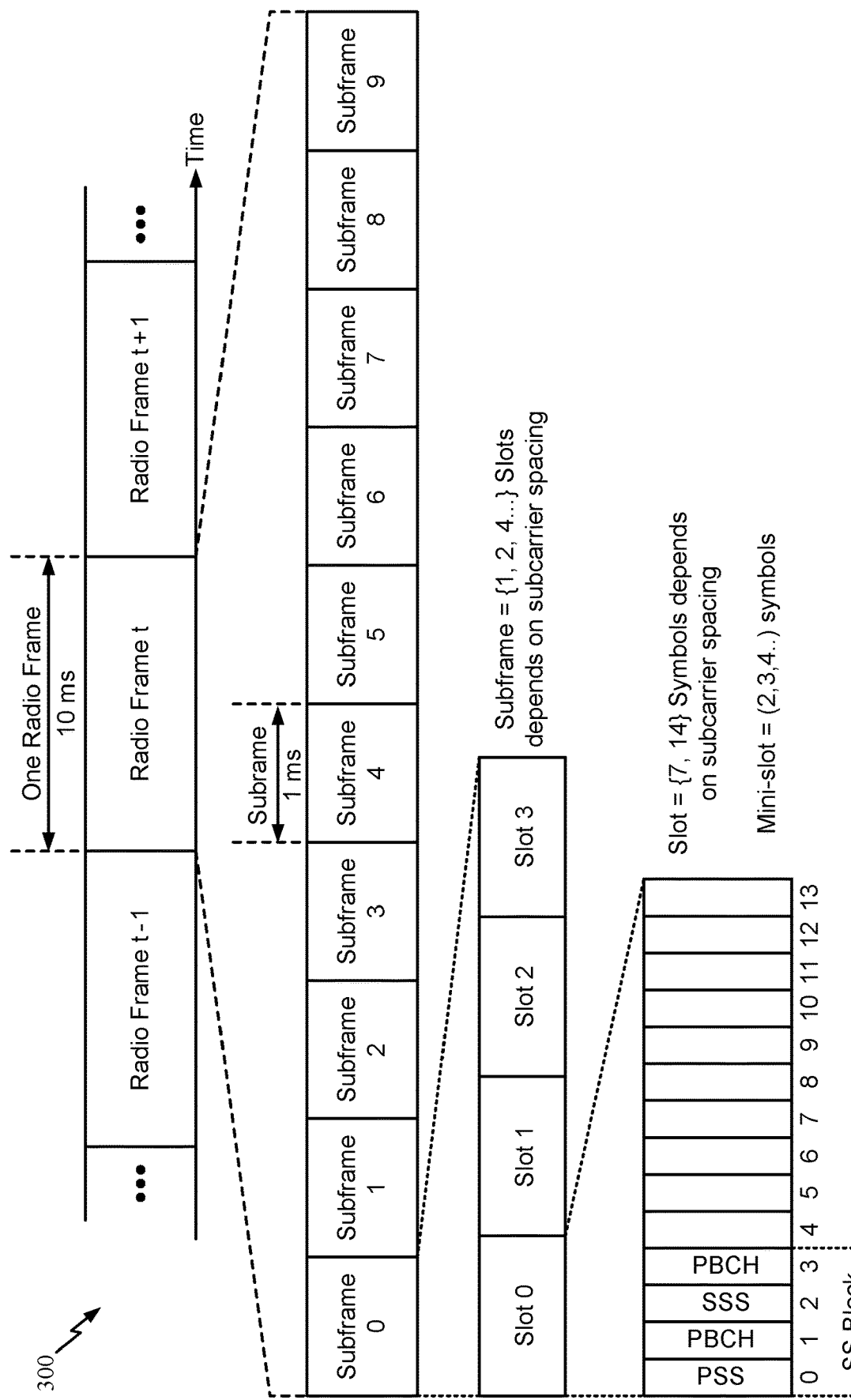
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Identifying a Default Beam for a Physical Downlink Shared Channel (PDSCH)

Aspects of the present disclosure provide apparatus, methods, processing systems, and computer readable mediums for identifying and using a default beam to transmit and receive a physical downlink shared channel (PDSCH).

In various wireless standards, a default beam may be defined for channels such as the physical downlink shared channel (PDSCH). The default beam may be a beam that a network entity uses to transmit a PDSCH, and correspondingly that a user equipment uses to receive the PDSCH, in the absence of an indication of a different beam to use for transmitting (and receiving) the PDSCH.

Various rules may define how the default beam can be selected for a scheduled transmission of a PDSCH. In a first scenario, a default beam may be selected and used when a time offset between transmission of downlink control information (DCI) and a PDSCH scheduled by the DCI is less than a threshold value. In this scenario, the default beam used for the scheduled PDSCH may be defined as the beam associated with a control resource set (CORESET) having a lowest identifier within the latest monitored slot. Because different CORESETs may be monitored in different slots, the default beam may not be fixed across slots.

In a second scenario, a default beam may be selected in an environment where a UE is served by multiple network entities (e.g., transmit-receive points (TRPs)). Up to two TRPs per cell may be supported. Where the multiple TRPs transmit multiple DCIs scheduling multiple PDSCHs, the CORESETs may be divided into two pools. Each CORESET may be associated with a CORESET pool index, and each pool may be associated with or otherwise correspond to one of the multiple TRPs. Scheduling information carried on a physical downlink control channel (PDCCH) for a specific CORESET generally schedules the PDSCH for that specific CORESET, and the default beam for a specific TRP may be the beam associated with the CORESET with a lowest CORESET identifier from the CORESET pool associated with that specific TRP when any CORESET in the CORE- SET pool is monitored. In a multi-TRP scenario, the default beam may still vary across slots.

In some cases, the multiple TRPs may use a single DCI. A transmission configuration indicator (TCI) codepoint may be defined with a plurality of TCI states, and each TCI state may correspond to a beam from a TRP. For example, where two TRPs in a cell are supported and use a single DCI, a first TCI state may correspond to a beam from a first TRP of the two TRPs, and a second TCI state may correspond to a beam from a second TRP of the two TRPs. The default beam pairs from the TRPs may be the beams associated with the active TCI codepoint having a plurality of TCI states and being the lowest identifier of the plurality of TCI codepoints. In this scenario, the default beam may be fixed across slots and may not change due to changes in the monitored CORESETs.

To simplify beam management across slots, the default beam for a PDSCH may be fixed across slots. Fixing the default beam across slots generally allows a network entity (e.g., a gNodeB) to configure and use a beam having good signal strength characteristics (e.g., a reference signal received power (RSRP) above a threshold strength) as the default beam; because this beam generally has good signal strength characteristics, it may be assumed that UEs will be able to successfully receive signaling transmitted using the default beam. Further, the use of a default beam having good signal strength characteristics may allow for the signal-to-noise ratio of received signaling to be maximized across slots for joint combining or cross-slot reception. This may provide various benefits, for example, at higher subcarrier spacing (SCSs) (e.g., 480 kHz and 960 kHz spacing at higher bands, such as the 52.7 GHz-72.1 GHz bands). For example, given a quasicolocation (QCL) duration, the user of higher subcarrier spacings at higher bands may shorten the symbol length; however, the threshold time for a default beam to be used may be the same, meaning that more slots may be included in the threshold time for the default beam. Further, higher bands may have various coverage limitations, and to ameliorate these coverage limitations, multiple slots may be combined to increase the signal-to-noise ratio of a received signal.

A default beam that is invariant across slots may be determined based on one or more rules. In one example, the fixed default beam for a PDSCH may be determined based on a TCI state. For example, the fixed default beam may be the beam associated with an active PDSCH TCI having a lowest identifier in an active bandwidth part (BWP). In another example, the fixed default beam may be determined based on a CORESET identifier. For example, the fixed default beam may be the beam associated with a CORESET having a lowest CORESET identifier in the active BWP.

Fixed, invariant default beams across slots may simplify beam selection. However, using a fixed default beam may not be optimal in various scenarios. For example, a fixed default beam may reduce spatial diversity; in contrast, using different default beams for different slots may improve spatial diversity and mitigate problems that may arise against channel blockages. Further, a fixed default beam for a PDSCH may entail beam switching, which may impact intersymbol interference (e.g., in higher frequency bands, where the cyclic prefix is smaller due to smaller symbol lengths). For example, in one case, the default beam for the PDSCH may follow the PDCCH beam in the beginning of the same slot, which may allow for the avoidance of beam switching before the first symbol of the PDSCH; however, beam switching may be needed in other situations, as different beams may be used for the PDSCH and PDCCH.

Fixed, invariant default beams across slots may also not be optimal in beam failure recovery scenarios. After recovery from a beam failure (e.g., a scenario in which a signal quality metric, such as RSRP, for a monitored beam in a cell falls below a threshold value), the original TCI state configuration may no longer be valid. However, there may be a timing gap between beam failure recovery and TCI state reconfiguration, during which time a fixed default beam may not be an optimal beam for use in communicating between a network entity and a UE.

Aspects of the present disclosure provide techniques for dynamically selecting and using an active default beam for communications between a network entity and a user equipment. By allowing for default beams to be dynamically selected, the default beam selected for a UE may account for various capabilities of the UE, channel conditions, and other information. Further, allowing for dynamic selection and use of default beams for communications between a network entity and a UE may improve spatial diversity, mitigate the impact of beam switching on intersymbol interference, and provide other improvements to wireless communications.

Figure 4:
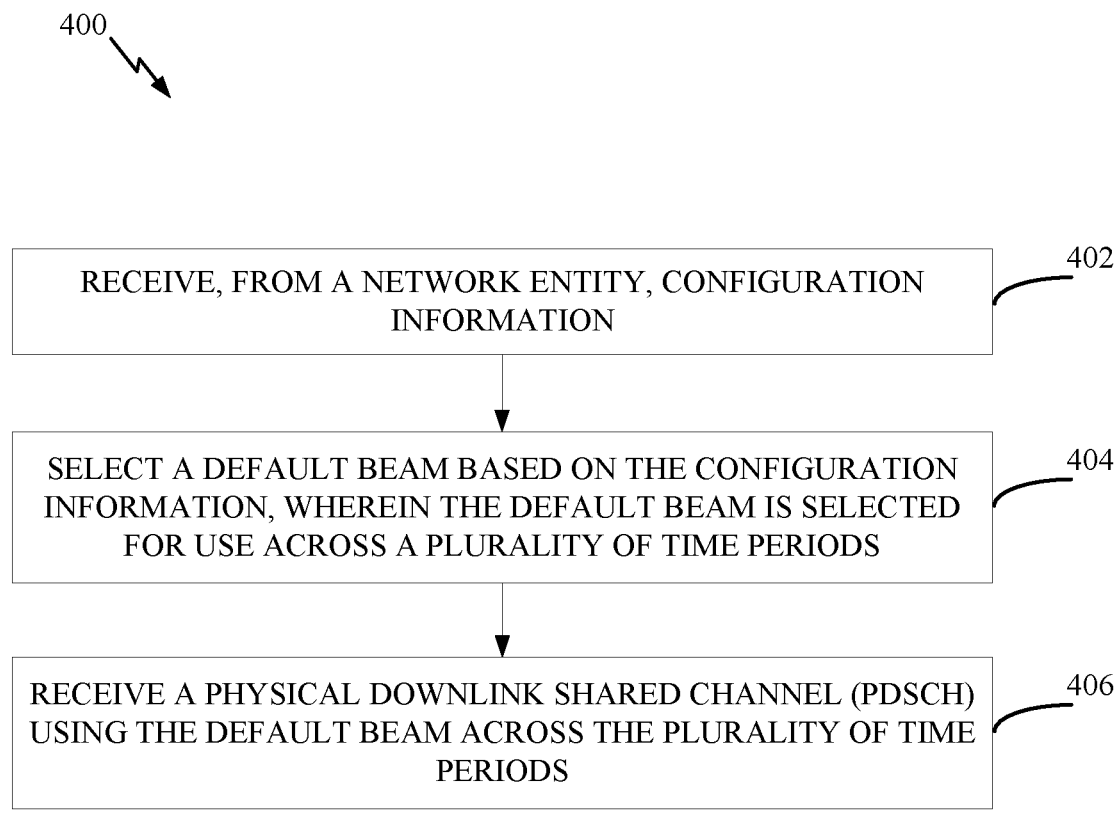
FIG. 4 illustrates example operations that may be performed by a user equipment (UE) to identify a default beam to use for receiving a physical downlink shared channel (PDSCH), in accordance with certain aspects of the present disclosure.

FIG. 4 illustrates example operations 400 that may be performed by a user equipment (UE) for selecting a default beam and communicating with a network entity using the default beam, according to certain aspects described herein.

As illustrated, operations 400 may begin at block 402, where the UE receives, from a network entity, configuration information. As discussed in further detail below, the configuration information generally includes information identifying a default beam for the UE to use and/or one or more rules for selecting the default beam.

At block 404, the UE selects a default beam based on the configuration information. Generally, the default beam may be selected for use across a plurality of time periods. For example, the default beam may be selected for use across a plurality of slots. In some aspects, the default beam may be selected for use when a time offset between a physical downlink shared channel (PDSCH) and a physical downlink control channel (PDCCH) is shorter than a threshold amount of time, which may be based on UE capability information.

At block 406, the UE receives a PDSCH using the default beam across the plurality of time periods.

Figure 5:
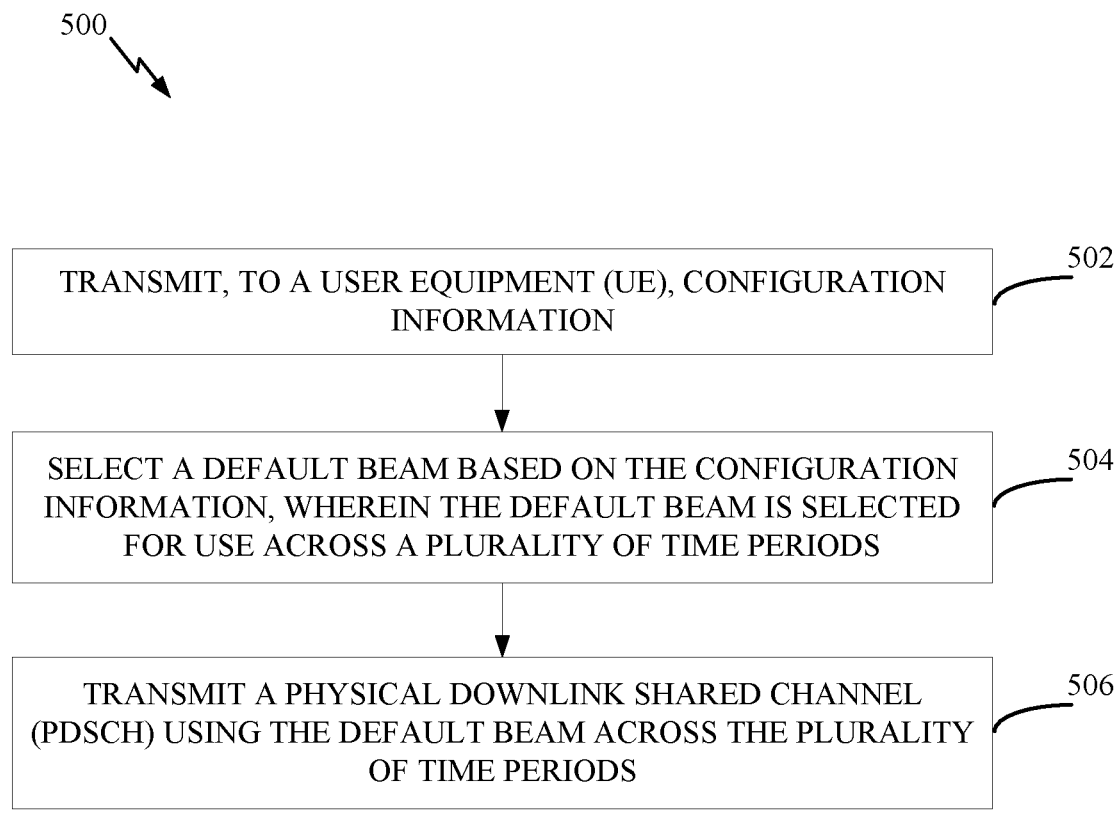
FIG. 5 illustrates example operations that may be performed by a network entity to identify a default beam to use for transmitting a physical downlink shared channel (PDSCH), in accordance with certain aspects of the present disclosure.

FIG. 5 illustrates example operations 500 that may be performed by a network entity for selecting a default beam and communicating with a user equipment (UE) using the selected default beam, according to certain aspects described herein.

As illustrated, operations 500 may begin at block 502 where the network entity transmits, to a user equipment (UE), configuration information.

At block 504, the network entity selects a default beam based on the configuration information. As discussed, the default beam is generally selected for use across a plurality of time periods.

At block 506, the network entity transmits a physical downlink shared channel (PDSCH) using the default beam across the plurality of time periods.

In some aspects, the configuration information may include information identifying a default beam. The identified default beam may be selected by the network entity based on UE capabilities. For example, the network entity can determine which beam to use as a default beam (and thus, to signal to the UE) based, for example, on which methods for selecting a default beam that the UE supports, a UE capability to perform beam switching and/or soft-combining, or the like.

In some aspects, the configuration information may include information specifying one or more rules for selecting the default beam. The rules may specify, for example, that when tone spacing or symbol length is smaller than a threshold tone spacing or symbol length, the fixed default beam may be deselected. In some aspects, the rules may be based on whether the UE is operating within a first frequency band or a second frequency band. For example, if the UE is operating in the first frequency band (e.g., below 52.6 GHz), the default beam may be selected based on a CORESET identifier of a latest monitored slot. If the UE is operating in the second frequency band (e.g., above 52.6 GHz), the default beam may be selected as the beam associated with a TCI state with a lowest identifier in an active BWP or the beam associated with a CORESET with a lowest identifier in the active BWP.

In some aspects, a default mode for selecting the default beam may be used for initial access by the UE to a network entity (e.g., until the UE receives configuration information from the network entity identifying a default beam or a technique for selecting the default beam, or some other indication to use a fixed beam across slots). For example, the UE may be configured a priori or via information carried in a system information block (SIB) to select the default beam as a beam associated with a CORESET with a lowest identifier in a latest monitored slot. The default beam may differ for different configurations, such as frequency bands and subcarrier spacings. In another example, the default mode may specify that the default beam comprises a fixed beam associated with a TCI state having a lowest identifier in the active BWP.

In some aspects, the configuration information may include one or more rules for selecting the default beam in response to a BFR event. Generally, these rules for selecting the default beam in response to a BFR event may apply between beam failure recovery and receipt, from the network entity, of an indication of a default beam to use or rules for selecting the default beam. In one example, the rules may specify that when a default beam used prior to the BFR event is selected based on a TCI state, the default beam selected after the BFR event may be the beam associated with a CORESET having a lowest identifier for a latest monitored slot or a beam associated with a CORESET having a lowest identifier in an active BWP. In another example, when the default beam prior to the BFR is fixed (e.g., using a TCI state to determine the default beam), the default beam after the BFR event may be selected as a beam associated with a CORESET having a lowest identifier for a latest monitored slot. This default beam may be used, for example, until the UE receives an indication to use a fixed beam across slots or until UE receives reconfiguration of TCI states.

In some aspects, the UE may indicate, to the network entity, UE capability for dynamically changing rules for selecting the default beam. The network entity may transmit configuration information identifying rules for selecting the default beam based on the indicated UE capability for dynamically changing these rules. For example, the network entity may indicate that a default beam is fixed across slots where a UE indicates that it does not support dynamically changing rules for selecting the default beam or has limited support for dynamically changing rules for selecting the default beam. Similarly, the network entity may specify which rules the UE is to use in identifying a default beam in configuration information provided to the UE if the UE indicates that it does support dynamically changing rules for selecting the default beam.

Figure 6:
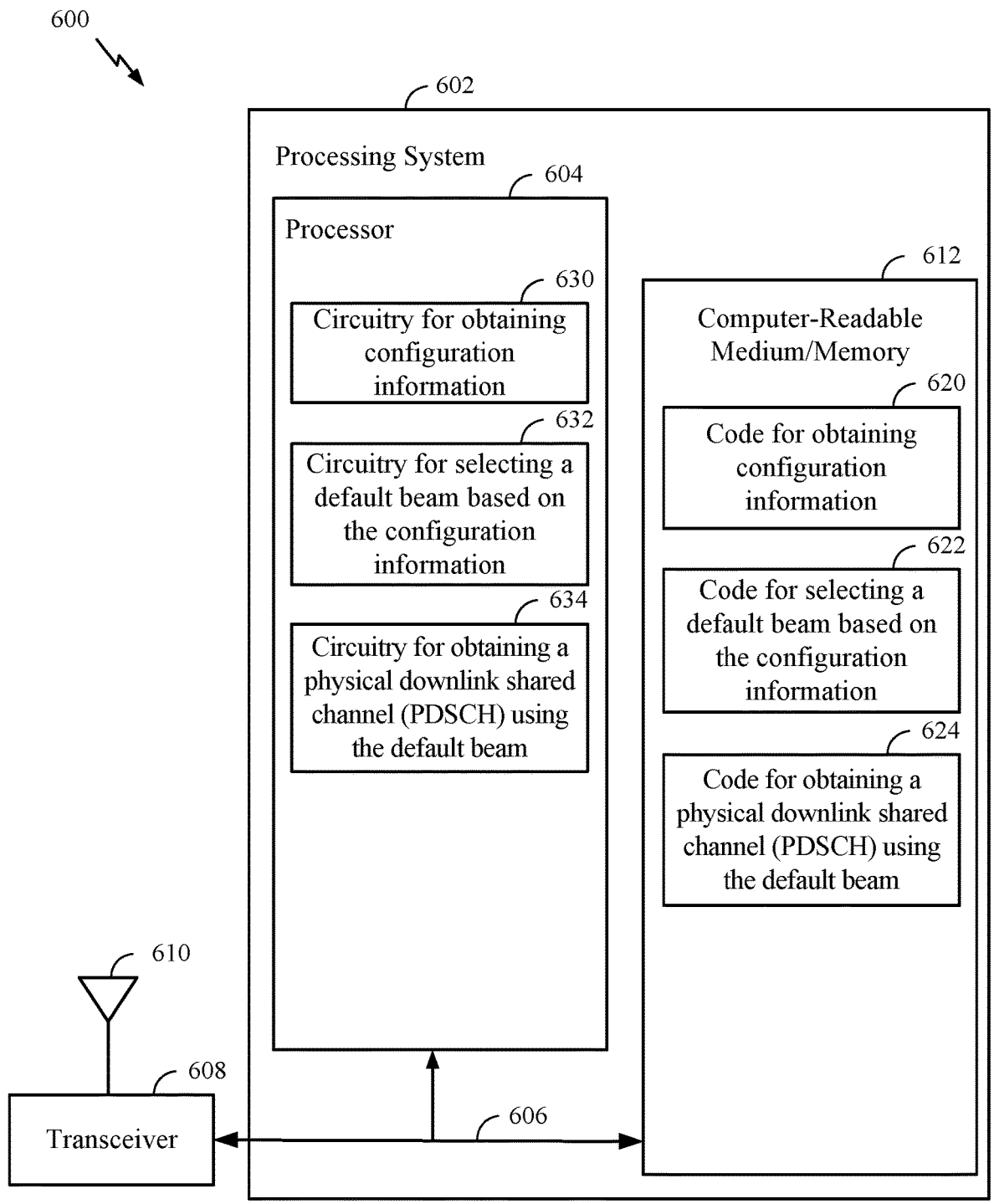
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable codes) that when executed by the processor 604, cause the processor 604 to perform the operations illustrated in FIG. 4, or other operations for performing the various techniques discussed herein for identifying a default beam for use in communications between a network entity and a user equipment. In certain aspects, computer-readable medium/memory 612 stores code 620 for obtaining configuration information; code 622 for selecting a default beam based on the configuration information; and code 624 for obtaining a physical downlink shared channel (PDSCH) using the default beam. In certain aspects, the processor 604 has circuitry configured to implement the code stored in the computer-readable medium/memory 612. The processor 604 includes circuitry 630 for obtaining configuration information; circuitry 632 for selecting a default beam based on the configuration information; and circuitry 634 for obtaining a physical downlink shared channel (PDSCH) using the default beam.

Figure 7:
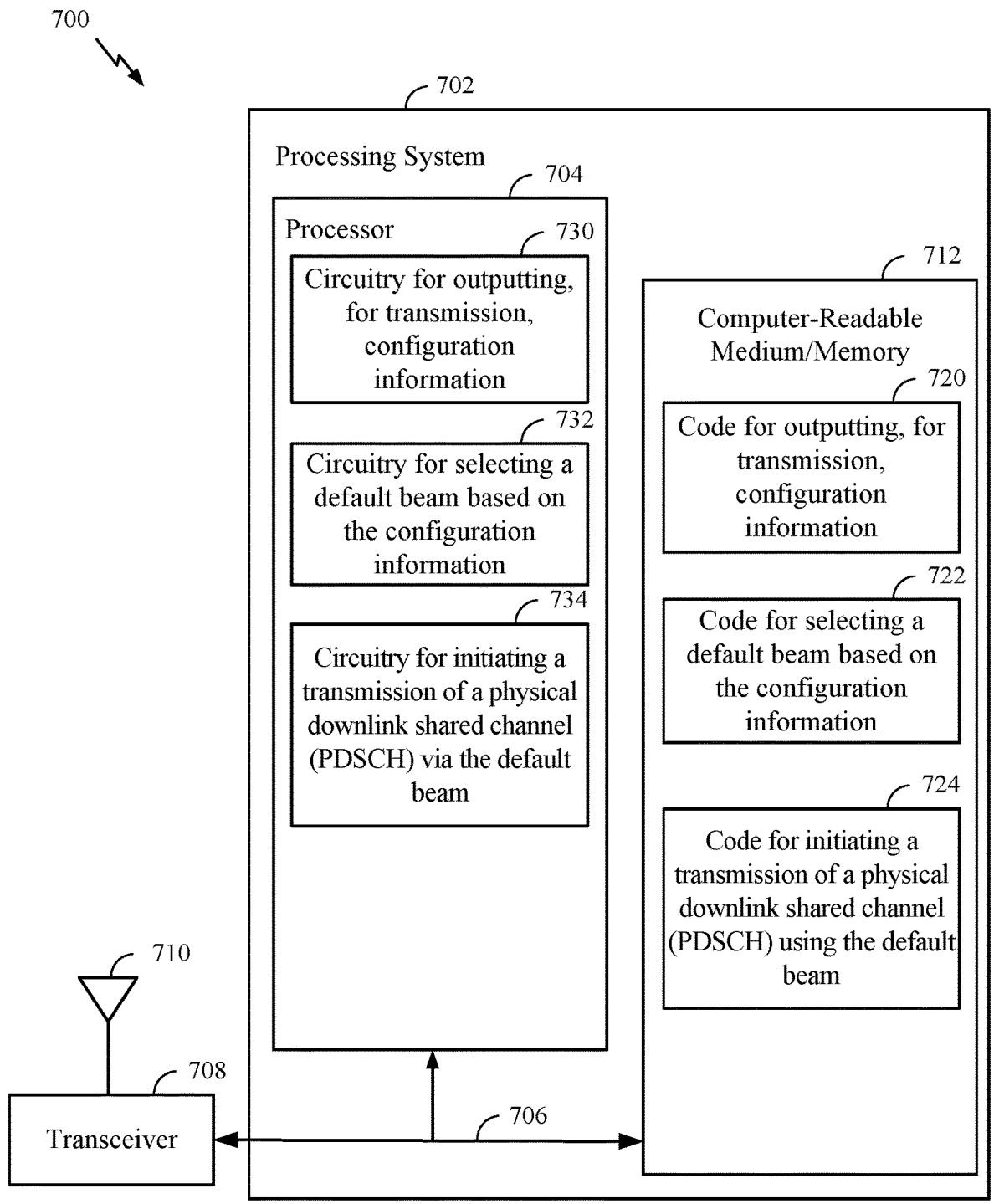
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable codes) that when executed by the processor 704, cause the processor 704 to perform the operations illustrated in FIG. 5, or other operations for identifying a default beam for use in communications between a network entity and a user equipment. In certain aspects, computer-readable medium/memory 712 stores code 720 for outputting, for transmission, configuration information; code 722 for selecting a default beam based on the configuration information; and code 724 for initiating a transmission of a physical downlink shared channel (PDSCH) via the default beam. In certain aspects, the processor 704 has circuitry configured to implement the code stored in the computer-readable medium/memory 712. The processor 704 includes circuitry 730 for outputting, for transmission, configuration information; circuitry 722 for selecting a default beam based on the configuration information; and circuitry 724 for initiating a transmission of a physical downlink shared channel (PDSCH) via the default beam.

Example Aspects

In addition to the various aspects described above, aspects of specific combinations are within the scope of the disclosure, some of which are detailed below:

Aspect 1: A method for wireless communications by a user equipment (UE), comprising: receiving, from a network entity, configuration information; selecting a default beam based on the configuration information, wherein the default beam is selected for use across a plurality of time periods; and receiving a physical downlink shared channel (PDSCH) using the default beam across the plurality of time periods.

Aspect 2: The method of Aspect 1, wherein the configuration information includes information identifying a beam selected based on UE capability information as the default beam.

Aspect 3: The method of any one of Aspects 1-2, wherein the configuration information identifies one or more rules for selecting the default beam.

Aspect 4: The method of Aspect 3, wherein the one or more rules comprise a rule for selecting the default beam based on whether the UE is operating in a first frequency band or a second frequency band.

Aspect 5: The method of Aspect 4, wherein the rule specifies that the default beam is selected based on a control resource set (CORESET) identifier of a latest monitored slot when the UE is operating in the first frequency band.

Aspect 6: The method of Aspect 4, wherein the rule specifies, when the UE is operating in the second frequency band, the default beam comprises a fixed beam associated with at least one of a transmission configuration indicator (TCI) state with a lowest identifier in an active bandwidth part (BWP) or a control resource set (CORESET) with a lowest identifier in the active BWP.

Aspect 7: The method of any one of Aspects 1-6, wherein the configuration information comprises an indication to select the default beam as a beam associated with a control resource set (CORESET) with a lowest identifier in a latest monitored slot until the UE receives another indication to use a fixed beam across slots.

Aspect 8: The method of any one of Aspects 1-7, wherein the configuration information includes one or more rules for selecting the default beam in response to a beam failure recovery (BFR) event.

Aspect 9: The method of Aspect 8, wherein the one or more rules specify that when a default beam prior to the BFR event is selected based on a transmission configuration indicator (TCI) state, the default beam is selected as a beam associated with a control resource set (CORESET) having a lowest identifier for a latest monitored slot or a beam associated with a CORESET having a lowest identifier in an active bandwidth part (BWP).

Aspect 10: The method of Aspect 8, wherein the one or more rules specify that when a default beam prior to the BFR event is fixed, the default beam is selected as a beam associated with a control resource set (CORESET) having a lowest identifier for a latest monitored slot until the UE receives an indication to use a fixed beam across slots.

Aspect 11: The method of any one of Aspects 1-10, further comprising: indicating, to the network entity, UE capability for dynamically changing one or more rules associated with the selection of the default beam.

Aspect 12: The method of any one of Aspects 1-11, further comprising: prior to receiving the configuration information, selecting an initial default beam based on a default rule.

Aspect 13: The method of Aspect 12, wherein the default rule specifies that the default beam comprises a fixed beam associated with a control resource set (CORESET) with a lowest identifier in an active bandwidth part (BWP).

Aspect 14: The method of Aspect 12, wherein the default rule specifies that the default beam comprises a fixed beam associated with a transmission configuration indicator (TCI) state with a lowest identifier in an active bandwidth part (BWP).

Aspect 15: The method of any one of Aspects 1-14, wherein the PDSCH is received using the default beam across the plurality of time periods when a time offset between the PDSCH and a physical downlink control channel (PDCCH) is equal to or less than a threshold amount of time.

Aspect 16: The method of Aspect 15, wherein the threshold amount of time is based on a capability of the UE.

Aspect 17: A method for wireless communications by a network entity, comprising: transmitting, to a user equipment (UE), configuration information; selecting a default beam based on the configuration information, wherein the default beam is selected for use across a plurality of time periods; and transmitting a physical downlink shared channel (PDSCH) using the default beam across the plurality of time periods.

Aspect 18: The method of Aspect 17, wherein the configuration information includes information identifying the selected default beam as a beam selected based on UE capability information.

Aspect 19: The method of any one of Aspects 17-18, wherein the configuration information identifies one or more rules for selecting the default beam.

Aspect 20: The method of Aspect 19, wherein the one or more rules comprise a rule for selecting the default beam based on whether the UE is operating in a first frequency band or a second frequency band.

Aspect 21: The method of Aspect 20, wherein the rule specifies that the default beam is selected based on a control resource set (CORESET) identifier of a latest monitored slot when the UE is operating in the first frequency band.

Aspect 22: The method of Aspect 20, wherein the rule specifies, when the UE is operating in the second frequency band, the default beam comprises a fixed beam associated with at least one of a transmission configuration indicator (TCI) state with a lowest identifier in an active bandwidth part (BWP) or a control resource set (CORESET) with a lowest identifier in the active BWP.

Aspect 23: The method of any one of Aspects 17-22, wherein the configuration information comprises an indication to select the default beam as a beam associated with a control resource set (CORESET) with a lowest identifier in a latest monitored slot until the UE receives another indication to use a fixed beam across slots.

Aspect 24: The method of any one of Aspects 17-23, wherein the configuration information includes one or more rules for selecting the default beam in response to a beam failure recovery (BFR) event.

Aspect 25: The method of Aspect 24, wherein the one or more rules specify that when a default beam prior to the BFR event is selected based on a transmission configuration indicator (TCI) state, the default beam is selected as a beam associated with a control resource set (CORESET) having a lowest identifier for a latest monitored slot or a beam associated with a CORESET having a lowest identifier in an active bandwidth part (BWP).

Aspect 26: The method of Aspect 24, wherein the one or more rules specify that when a default beam prior to the BFR event is fixed, the default beam is selected as a beam associated with a control resource set (CORESET) having a lowest identifier for a latest monitored slot until the UE receives an indication to use a fixed beam across slots.

Aspect 27: The method of any one of Aspects 17-26, further comprising: receiving, from the UE, signaling indicating a UE capability for dynamically changing one or more rules associated with the selection of the default beam.

Aspect 28: The method of any one of Aspects 17-27, further comprising: prior to the transmission of the configuration information, selecting an initial default beam based on a default rule.

Aspect 29: The method of Aspect 28, wherein the default rule specifies that the default beam comprises a fixed beam associated with a control resource set (CORESET) with a lowest identifier in an active bandwidth part (BWP).

Aspect 30: The method of Aspect 28, wherein the default rule specifies that the default beam comprises a fixed beam associated with a transmission configuration indicator (TCI) state with a lowest identifier in an active bandwidth part (BWP).

Aspect 31: The method of any one of Aspects 17-30, wherein the PDSCH is transmitted using the default beam across the plurality of time periods when a time offset between the PDSCH and a physical downlink control channel (PDCCH) is equal to or less than a threshold amount of time.

Aspect 32: The method of any one of Aspects 17-31, wherein the threshold amount of time is based on a capability of the UE.

Aspect 33: A user equipment (UE), comprising: a transceiver, a memory having instructions stored thereon, and at least one processor configured to execute the instructions for performing the operations of one or more of Aspects 1-16.

Aspect 34. A network entity, comprising: a transceiver, a memory having instructions stored thereon, and at least one processor configured to execute the instructions for performing the operations of one or more of Aspects 17-32.

Aspect 35: A user equipment (UE), comprising: means for performing the operations of one or more of the Aspects 1-16.

Aspect 36: A network entity, comprising: means for performing the operations of one or more of the Aspects 17-32.

Aspect 37: An apparatus for wireless communications by a user equipment (UE), comprising: an interface configured to obtain, from a network entity, configuration information; a memory having instructions stored thereon; and at least one processor configured to execute the instructions to cause the apparatus to select a default beam based on the configuration information, wherein the default beam is selected for use across a plurality of time periods and obtain a physical downlink shared channel (PDSCH) using the default beam across the plurality of time periods.

Aspect 38: An apparatus for wireless communications by a network entity, comprising: an interface configured to output, for transmission to a user equipment (UE), configuration information; a memory having instructions stored thereon; and at least one processor configured to execute the instructions to cause the apparatus to select a default beam based on the configuration information, wherein the default beam is selected for use across a plurality of time periods and initiate a transmission of a physical downlink shared channel (PDSCH) via the default beam across the plurality of time periods.

Aspect 39: A computer-readable medium for wireless communications comprising instructions executable by an apparatus to: obtain, from a network entity, configuration information; select a default beam based on the configuration information, wherein the default beam is selected for use across a plurality of time periods; and obtain a physical downlink shared channel (PDSCH) using the default beam across the plurality of time periods.

Aspect 40: A computer-readable medium for wireless communications comprising instructions executable by an apparatus to: output, for transmission to a user equipment (UE), configuration information; select a default beam based on the configuration information, wherein the default beam is selected for use across a plurality of time periods; and initiate a transmission of a physical downlink shared channel (PDSCH) via the default beam across the plurality of time periods.

Additional Considerations

The techniques described herein may be used for various wireless communications technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node such as a UE or a BS may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). The previous description is provided to enable any person skilled in the art to practice the various aspects described herein.

Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, processors 266, 258, 264, and/or controller/processor 280 of the UE 120 and/or processors 220, 230, 238, and/or controller/processor 240 of the BS 110 shown in FIG. 2 may be configured to perform operations 400 of FIG. 4 and operations 500 of FIG. 5.

Means for receiving may include a receiver such as antenna(s) and/or receive processor(s) illustrated in FIG. 2. Means for transmitting may include a transmitter such as antenna(s) and/or transmit processor(s) illustrated in FIG. 2. Means for indicating and means for selecting may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the over all system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), the method comprising:
   receiving, from a network entity, configuration information, wherein the configuration information includes:
   (i) an indication to select a default beam as a beam associated with a control resource set (CORESET) with a lowest identifier in a latest monitored slot until the UE receives another indication to use a fixed beam across slots; or
   one or more first rules for selecting the default beam in response to a beam failure recovery; and
   (ii) one or more second rules for selecting the default beam, the one or more second rules comprising:
   a first rule that, for UE operation in a first frequency band, the default beam is selected based on a control resource set (CORESET) identifier of a latest monitored slot; and a second rule that, for UE operation in a second frequency band, the default beam comprises a fixed beam associated with at least one of a transmission configuration indicator (TCI) state with a lowest identifier in an active bandwidth part (BWP) or a CORESET with a lowest identifier in the active BWP;

selecting the default beam based on the configuration information; and receiving a physical downlink shared channel (PDSCH) using the default beam.

2. The method of claim 1, wherein:

the configuration information includes the one or more first rules for selecting the default beam in response to the BFR event; and the one or more first rules specify that, when a default beam prior to the BFR event is selected based on a TCI state, the default beam is selected as the beam associated with the CORESET having the lowest identifier for the latest monitored slot or as the beam associated with the CORESET having the lowest identifier in the BWP.

3. The method of claim 1, wherein:

the configuration information includes the one or more first rules for selecting the default beam in response to the BFR event; and the one or more first rules specify that, when a default beam prior to the BFR event is fixed, the default beam is selected as the beam associated with the CORESET having the lowest identifier for the latest monitored slot until the UE receives the indication to use the fixed beam across slots.

4. The method of claim 1, further comprising, at least one of:

indicating, to the network entity, UE capability for dynamically changing one or more rules associated with the selection of the default beam; or prior to receiving the configuration information, selecting an initial default beam based on a default rule.

5. The method of claim 4, wherein the default rule specifies that the default beam comprises a fixed beam associated with the CORSET with the lowest identifier in the active BWP.

6. The method of claim 4, wherein the default rule specifies that the default beam comprises a fixed beam associated with the TCI state with the lowest identifier in the active BWP.

7. The method of claim 1, wherein the PDSCH is received using the default beam when a time offset between the PDSCH and a physical downlink control channel (PDCCH) scheduling the PDSCH is equal to or less than a threshold amount of time.

8. The method of claim 7, wherein the threshold amount of time is based on a capability of the UE.

9. The method of claim 1, wherein the fixed beam comprises a default beam that is fixed over a plurality of time periods.

10. The method of claim 1, wherein the configuration information comprises the indication to select the default beam as the beam associated with the CORESET with the lowest identifier in the latest monitored slot until the UE receives another indication to use a fixed beam across slots.

11. The method of claim 1, wherein the configuration information comprises the one or more first rules for selecting the default beam in response to the BFR event.

12. A method for wireless communications by a network entity, the method comprising:

transmitting, to a user equipment (UE), configuration information, wherein the configuration information includes:

(i) an indication to select a default beam as a beam associated with a control resource set (CORESET) with a lowest identifier in a latest monitored slot until the UE receives another indication to use a fixed beam across slots; or one or more first rules for selecting the default beam in response to a beam failure recovery; and (ii) one or more second rules for selecting the default beam, the one or more second rules comprising:

a first rule that, for UE operation in a first frequency band, the default beam is selected based on a control resource set (CORESET) identifier of a latest monitored slot; and a second rule that, for UE operation in a second frequency band, the default beam comprises a fixed beam associated with at least one of a transmission configuration indicator (TCI) state with a lowest identifier in an active bandwidth part (BWP) or a CORESET with a lowest identifier in the active BWP;

selecting the default beam based on the configuration information; and transmitting a physical downlink shared channel (PDSCH) using the default beam.

13. The method of claim 12, wherein:

the configuration information includes the one or more first rules for selecting the default beam in response to the BFR event; and the one or more first rules specify that, when a default beam prior to the BFR event is selected based on a TCI state, the default beam is selected as the beam associated with the CORESET having the lowest identifier for the latest monitored slot or as the beam associated with the CORESET having the lowest identifier in the BWP.

14. The method of claim 12, wherein:

the configuration information includes the one or more first rules for selecting the default beam in response to the BFR event; and the one or more first rules specify that, when a default beam prior to the BFR event is fixed, the default beam is selected as the beam associated with the CORESET having the lowest identifier for the latest monitored slot until the UE receives the indication to use the fixed beam across slots.

15. The method of claim 12, further comprising, at least one of:

receiving, from the UE, signaling indicating a UE capability for dynamically changing one or more rules associated with the selection of the default beam; or prior to the transmission of the configuration information, selecting an initial default beam based on a default rule.

16. The method of claim 15, wherein the default rule specifies that the default beam comprises a fixed beam associated with the CORESET with the lowest identifier in the active BWP.

17. The method of claim 15, wherein the default rule specifies that the default beam comprises a fixed beam associated with the TCI state with the lowest identifier in the active BWP.

18. The method of claim 12, wherein the PDSCH is transmitted using the default beam when a time offset between the PDSCH and a physical downlink control channel (PDCCH) scheduling the PDSCH is equal to or less than a threshold amount of time.

19. A user equipment (UE), comprising:
a receiver;
a memory having executable instructions stored thereon; and
at least one processor configured to execute the executable instructions to cause:
the receiver to receive, from a network entity, configuration information, wherein the configuration information includes:
(i) an indication to select a default beam as a beam associated with a control resource set (CORESET) with a lowest identifier in a latest monitored slot until the UE receives another indication to use a fixed beam across slots; or
one or more first rules for selecting the default beam in response to a beam failure recovery; and
(ii) one or more second rules for selecting the default beam, the one or more second rules comprising a:
a first rule that, for UE operation in a first frequency band, the default beam is selected based on a control resource set (CORESET) identifier of a latest monitored slot; and
a second rule that, for UE operation in a second frequency band, the default beam comprises a fixed beam associated with at least one of a transmission configuration indicator (TCI) state with a lowest identifier in an active bandwidth part (BWP) or a CORESET with a lowest identifier in the active BWP;
the at least one processor to select the default beam based on the configuration information; and
the receiver to receive a physical downlink shared channel (PDSCH) using the default beam.

20. The UE of claim 19, wherein:
the configuration information includes the one or more first rules for selecting the default beam in response to the BFR event; and
the one or more first rules specify at least one of:
that, when a default beam prior to the BFR event is selected based on the TCI state, the default beam is selected as the beam associated with the CORESET having the lowest identifier for the latest monitored slot or the beam associated with the CORESET having the lowest identifier in the active BWP; or
that, when a default beam prior to the BFR event is fixed, the default beam is selected as the beam associated with the CORESET having the lowest identifier for the latest monitored slot until the UE receives the indication to use the fixed beam across slots.

21. The UE of claim 19, wherein the configuration information comprises the indication to select the default beam as the beam associated with the CORESET with the lowest identifier in the latest monitored slot until the UE receives another indication to use a fixed beam across slots.

22. The UE of claim 19, wherein the configuration information comprises the one or more first rules for selecting the default beam in response to the BFR event.

23. A network entity, comprising:
a transmitter;
a memory having executable instructions stored thereon; and
at least one processor configured to execute the executable instructions to cause:
the transmitter to transmit, to a user equipment (UE), configuration information, wherein the configuration information includes:
(i) an indication to select a default beam as a beam associated with a control resource set (CORESET) with a lowest identifier in a latest monitored slot until the UE receives another indication to use a fixed beam across slots; or
one or more first rules for selecting the default beam in response to a beam failure recovery; and
(ii) one or more second rules for selecting the default beam, the one or more second rules comprising a:
a first rule that, for UE operation in a first frequency band, the default beam is selected based on a control resource set (CORESET) identifier of a latest monitored slot; and
a second rule that, for UE operation in a second frequency band, the default beam comprises a fixed beam associated with at least one of a transmission configuration indicator (TCI) state with a lowest identifier in an active bandwidth part (BWP) or a CORESET with a lowest identifier in the active BWP;
the at least one processor to select the default beam based on the configuration information; and
the transmitter to transmit a physical downlink shared channel (PDSCH) using the default beam.

24. The network entity of claim 23, wherein:
the configuration information includes the one or more first rules for selecting the default beam in response to the BFR event; and
the one or more first rules specify at least one of:
that, when a default beam prior to the BFR event is selected based on the TCI state, the default beam is selected as the beam associated with the CORESET having the lowest identifier for the latest monitored slot or the beam associated with the CORESET having the lowest identifier in the active BWP; or
that, when a default beam prior to the BFR event is fixed, the default beam is selected as the beam associated with the CORESET having the lowest identifier for the latest monitored slot until the UE receives the indication to use the fixed beam across slots.

* * * * *